US011909497B2

(12) United States Patent
Bengtsson et al.

(10) Patent No.: US 11,909,497 B2
(45) Date of Patent: Feb. 20, 2024

(54) INDICATING USER EQUIPMENT (UE) POLORIZATION TRACKING CAPACITY

(71) Applicant: Sony Group Corporation, Tokyo (JP)

(72) Inventors: Erik Bengtsson, Eslov (SE); Olof Zander, Sodra Sandby (SE); Fredrik Rusek, Eslov (SE)

(73) Assignee: Sony Group Corporation, Tokyo (JP)

( * ) Notice: Subject to any disclaimer, the term of this patent is extended or adjusted under 35 U.S.C. 154(b) by 23 days.

(21) Appl. No.: 17/278,311

(22) PCT Filed: Sep. 26, 2019

(86) PCT No.: PCT/EP2019/076007
§ 371 (c)(1),
(2) Date: Mar. 21, 2021

(87) PCT Pub. No.: WO2020/064914
PCT Pub. Date: Apr. 2, 2020

(65) Prior Publication Data
US 2022/0038170 A1 Feb. 3, 2022

(30) Foreign Application Priority Data
Sep. 28, 2018 (SE) .................... 1830272-9

(51) Int. Cl.
*H04B 7/10* (2017.01)
*H04B 7/06* (2006.01)
*H04B 7/08* (2006.01)

(52) U.S. Cl.
CPC ............. *H04B 7/10* (2013.01); *H04B 7/0695* (2013.01); *H04B 7/088* (2013.01)

(58) Field of Classification Search
CPC ......... H04B 7/10; H04B 7/0695; H04B 7/088
See application file for complete search history.

(56) References Cited

U.S. PATENT DOCUMENTS

| 6,411,824 B1 * | 6/2002 | Eidson ...................... H04B 7/10 370/320 |
| 2003/0199270 A1 * | 10/2003 | Hamalainen ............. H04B 7/10 455/424 |

(Continued)

FOREIGN PATENT DOCUMENTS

| CN | 101272169 A | 9/2008 |
| CN | 103875190 A | 6/2014 |

(Continued)

OTHER PUBLICATIONS

International Search Report and Written Opinion from corresponding International Application No. PCT/EP2019/076007, dated Nov. 15, 2019, 10 pages.

*Primary Examiner* — Kenneth T Lam
(74) *Attorney, Agent, or Firm* — Tucker Ellis LLP

(57) ABSTRACT

A method (20) performed by a wireless terminal (10) in a wireless communication network (10, 30) is provided. In the method (20), based on a (fundamental) polarization tracking capability of the wireless terminal (10), at least one downlink polarization of at least one downlink communication between the wireless terminal (10) and an access node (30) of the wireless communication network (10, 30) is determined (204). A reference polarization from the at least one downlink polarization is selected (207). Based on the reference polarization and a (momentary) polarization tracking ability of the wireless terminal (10), at least one uplink polarization of at least one uplink communication between the wireless terminal (10) and the access node (30) is configured (210). A corresponding method (40) performed by the access node (30) is also provided, as well as the mentioned wireless terminal (10) and the access node (30).

20 Claims, 3 Drawing Sheets

(56) References Cited

U.S. PATENT DOCUMENTS

| | | | | |
|---|---|---|---|---|
| 2010/0164801 | A1* | 7/2010 | Ku | H04B 7/10 |
| | | | | 342/362 |
| 2017/0054222 | A1* | 2/2017 | Corman | H04B 7/18515 |
| 2018/0063693 | A1* | 3/2018 | Chakraborty | H04W 48/16 |

FOREIGN PATENT DOCUMENTS

| | | |
|---|---|---|
| CN | 107735958 A | 2/2018 |
| EP | 2797240 A1 | 10/2014 |

* cited by examiner

INDICATING USER EQUIPMENT (UE) POLORIZATION TRACKING CAPACITY

FIELD OF THE INVENTION

Various embodiments of the invention relate to methods performed in a wireless communication network by a wireless terminal and an access node, respectively, to indicate a polarization tracking capacity of the wireless terminal to the access node and to take advantage of the same.

BACKGROUND OF THE INVENTION

3GPP 5G standardization associated with spectrum bands in a millimeter wave range, e.g. above 6 GHz, has to deal with challenges such as, for instance, that transmission at these bands suffers from high path losses. This may be overcome by way of MIMO wireless transmission, which enables highly directional beams, or spatial channels, that focus transmitted radio frequency energy. Establishing such spatial channels in multiple directions enables spatial reuse of time/frequency/code resources.

Wireless terminals having dual polarized antennas may in principle communicate in both polarizations, which may improve the wireless communication network in a number of ways. However, such a capacity may not be available in all wireless terminals, in particular in the absence of 3GPP standardization of polarization requirements of wireless terminals.

BRIEF SUMMARY OF THE INVENTION

In view of the above, there is a need in the art for indicating a polarization tracking capacity of a wireless terminal to a corresponding access node, in order to take advantage of this information and improve the wireless communication network accordingly.

In particular, there is a need in the art for respective methods performed by a wireless terminal and an access node in a wireless communication network which indicate a polarization tracking capacity of the wireless terminal to the access node, and improve a system performance of the wireless communication network.

These underlying objects of the invention are each solved by the methods and devices as defined by the independent claims. Preferred embodiments of the invention are set forth in the dependent claims.

According to a first aspect, a method performed by a wireless terminal in a wireless communication network is provided. The method comprises: based on a polarization tracking capability of the wireless terminal, determining at least one downlink polarization of at least one downlink communication between the wireless terminal and an access node of the wireless communication network; selecting a reference polarization from the at least one downlink polarization; and based on the reference polarization and a polarization tracking ability of the wireless terminal, configuring at least one uplink polarization of at least one uplink communication between the wireless terminal and the access node.

The method may further comprise transmitting, to the access node, a first indication of the polarization tracking capability of the wireless terminal.

The method may further comprise receiving, from the access node, a trigger for activation of the polarization tracking capability of the wireless terminal.

The method may further comprise in response to receiving the trigger, activating the polarization tracking capability of the wireless terminal.

The at least one downlink polarization may comprise at least one polarization of at least one polarization-controlled downlink signal dedicated to the wireless terminal.

The at least one downlink polarization may comprise at least one polarization of at least one polarization-multiplexed downlink broadcast signal.

The at least one polarization-multiplexed downlink broadcast signal may be broadcasted during beam sweeps.

The at least one downlink polarization may comprise at least one polarization of a polarization-controlled pilot signal.

The method may further comprise receiving, from the access node, a second indication of the reference polarization to be selected from the at least one downlink polarization, the selecting being performed in accordance with the reference polarization.

The method may further comprise the selecting being performed in accordance with a predefined rule being valid at least between the wireless terminal and the access node.

The method may further comprise receiving, from the access node, a third indication of at least one polarization offset of the at least one uplink polarization with respect to the reference polarization, the configuring being performed in accordance with the at least one polarization offset.

The at least one polarization offset may be less than a predefined threshold.

According to a second aspect, a method performed by an access node in a wireless communication network is provided. The method comprises: configuring at least one downlink polarization of at least one downlink communication between a wireless terminal of the wireless communication network and the access node; selecting a reference polarization from the at least one downlink polarization; determining at least one uplink polarization of at least one uplink communication between the wireless terminal and the access node; and based on the at least one uplink polarization and the reference polarization, determining a polarization tracking ability of the wireless terminal.

The method may further comprise receiving, from the wireless terminal, a first indication of the polarization tracking capability of the wireless terminal.

The method may further comprise transmitting, to the wireless terminal, a trigger for activation of the polarization tracking capability of the wireless terminal.

The at least one downlink polarization may comprise at least one polarization of a polarization-controlled downlink signal dedicated to the wireless terminal.

The at least one downlink polarization may comprise at least one polarization of a polarization-multiplexed downlink broadcast signal.

The polarization-multiplexed downlink broadcast signal may be broadcasted during beam sweeps.

The at least one downlink polarization may comprise at least one polarization of a polarization-controlled pilot signal;

The selecting may be performed in accordance with a predefined rule being valid at least between the wireless terminal and the access node.

The method may further comprise transmitting, to the wireless terminal, a second indication of the reference polarization to be selected from the at least one downlink polarization.

The method may further comprise determining at least one polarization offset of the at least one uplink polarization with respect to the reference polarization; and transmitting, to the wireless terminal, a third indication of the at least one polarization offset.

The at least one polarization offset may be less than a predefined threshold.

The method may further comprise, based on the polarization tracking ability of the wireless terminal, selecting a decoding configuration for the at least one uplink communication.

The method may further comprise, based on the polarization tracking ability of the wireless terminal, allocating the at least one uplink communication to a polarization-multiplexed spatial beam.

According to a third aspect, a wireless terminal is provided. The wireless terminal comprises an antenna array and a processor. The antenna array has antenna elements being associated with mutually orthogonal planes of polarization, and the processor is configured for: based on a polarization tracking capability of the wireless terminal, determining at least one downlink polarization of at least one downlink communication between the wireless terminal and an access node of the wireless communication network; selecting a reference polarization from the at least one downlink polarization; and based on the reference polarization and a polarization tracking ability of the wireless terminal, configuring at least one uplink polarization of at least one uplink communication between the wireless terminal and the access node.

The wireless terminal may be configured for carrying out the method of the first aspect according to various embodiments.

According to a fourth aspect, an access node is provided. The access node comprises an antenna array and a processor. The antenna array has antenna elements being associated with mutually orthogonal planes of polarization, and the processor is configured for: configuring at least one downlink polarization of at least one downlink communication between a wireless terminal of the wireless communication network and the access node; selecting a reference polarization from the at least one downlink polarization; determining at least one uplink polarization of at least one uplink communication between the wireless terminal and the access node; and based on the at least one uplink polarization and the reference polarization, determining a polarization tracking ability of the wireless terminal.

The access node may be configured for carrying out the method of the second aspect according to various embodiments.

BRIEF DESCRIPTION OF THE DRAWINGS

Embodiments of the invention will be described with reference to the accompanying drawings, in which the same or similar reference numerals designate the same or similar elements.

DETAILED DESCRIPTION OF EMBODIMENTS

Figure 1:
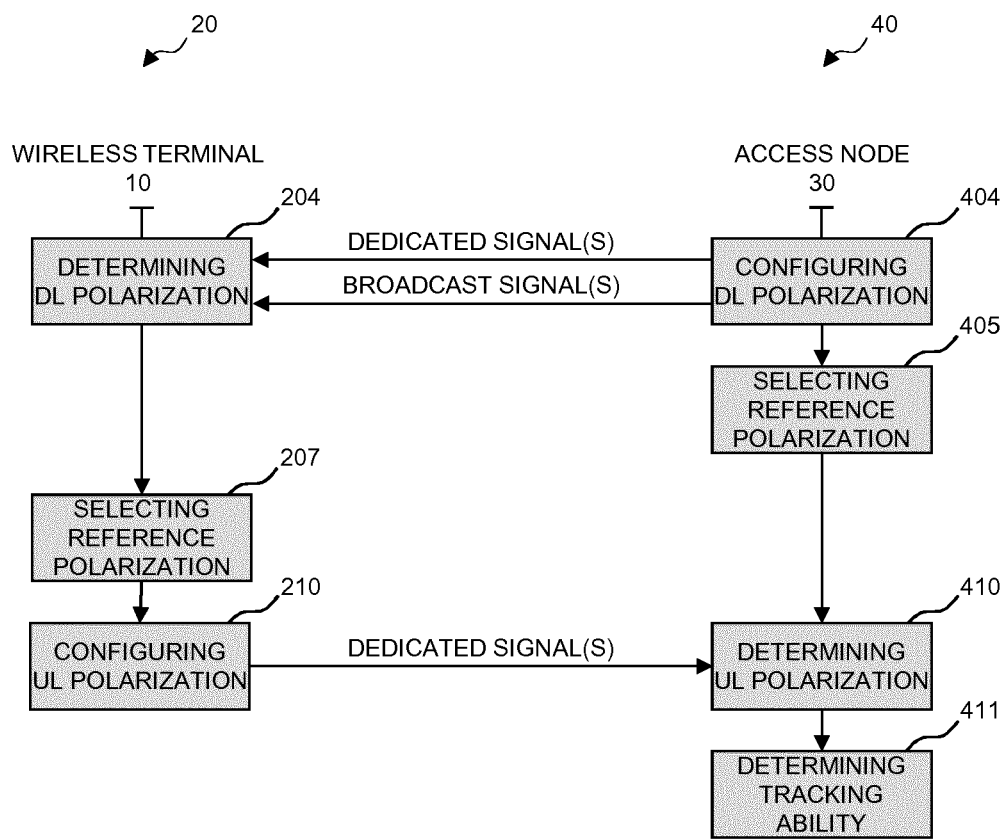
FIG. 1 illustrates respective methods according to first and second aspects performed by a wireless terminal and an access node in the wireless communication network 10, 30.

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network including multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

FIG. 1 illustrates respective methods 20; 40 according to first and second aspects performed by a wireless terminal 10 and an access node 30 in the wireless communication network 10, 30.

The key idea of these methods 20; 40 is that a wireless terminal 10 equipped with dual polarized antennas can be expected to track an arbitrary polarization defined by the access node 30.

The method 20 performed by the wireless terminal 10 is shown at a left-hand side of FIG. 1, and the method 40 performed by the access node 30 is shown at a right-hand side of FIG. 1.

In step 404, the access node 30 configures at least one downlink polarization of at least one downlink communication between the wireless terminal 10 and the access node 30.

As indicated in FIG. 1, the at least one downlink polarization may comprise at least one polarization of at least one polarization-controlled downlink signal dedicated to the wireless terminal 10.

Additionally or alternatively, the at least one downlink polarization may comprise at least one polarization of at least one polarization-multiplexed downlink broadcast signal. In particular, the at least one polarization-multiplexed downlink broadcast signal may be broadcasted during beam sweeps. In particular, the at least one downlink polarization may comprise at least one polarization of a polarization-controlled pilot signal, such as the Channel State Information-Reference Signal, CSI-RS.

As used herein, either of polarization or polarization state may refer to a property of a propagating electromagnetic wave, and more specifically to a direction of an electric field vector of the wave in a plane normal to a propagation direction of the wave. In other terms, the polarization or polarization state denotes a particular transversal (or perpendicular) oscillation direction of the electric field of the propagating wave with respect to a propagation direction of the wave. Alternatively, the polarization or polarization state may be defined as the ratio of signal powers associated with the antenna elements being associated with mutually orthogonal planes of polarization. The designation as a polarization state reflects that the polarization of a wave is subject to change, for instance due to polarization effects in the channel.

As used herein, polarization control may refer to a property or capacity of a radio node, such as a wireless terminal or an access node, of a wireless network to transmit and receive radio signals having a specified polarization state.

As used herein, polarization multiplex or polarization division multiplex may refer to a circumstance wherein two polarization controlled signals that share a spatial beam or channel have mutually orthogonal polarization states.

As will be set out below, the already existing CSI-RS downlink pilots may straightforwardly be used by the wireless terminal 10 to define a reference polarization.

In step 405, the access node 30 selects, for its part, a reference polarization from the at least one downlink polarization.

The selecting 405 may be performed in accordance with a predefined rule being valid at least between the wireless terminal 10 and the access node 30.

For instance, if the at least one downlink polarization comprises a single downlink polarization, such as a downlink polarization of a polarization-controlled CSI-RS pilot signal, the single downlink polarization may be selected 405 according to a predefined default rule as the reference polarization.

For instance, if the at least one downlink polarization comprises two downlink polarizations, either of the two downlink polarizations may be selected 405 according to a predefined rule as the reference polarization, such as the first one, or the second one.

In step 204, the wireless terminal 10 determines the at least one downlink polarization of the at least one downlink communication between the wireless terminal 10 and the access node 30. The latter step requires, i.e. is based on, a polarization tracking capability of the wireless terminal 10.

As used herein, polarization tracking may refer to a property or capacity of a radio node, such as a wireless terminal or an access node, of a wireless network to determine a polarization state of a received polarization-controlled signal, and to configure a polarization state of a transmitted signal in relation thereto, for instance to match the polarization state of the received signal.

As used herein, a polarization tracking capability may refer to a property or capacity of a wireless terminal to perform polarization tracking in relation to a received polarization-controlled signal in general. In other terms, the wireless terminal may be equipped to perform polarization tracking, which may entail a dual polarized antenna.

For instance, the wireless terminal 10 may determine the at least one downlink polarization on a best effort basis. In other terms.

As used herein, an access node may refer to a serving radio node of a wireless communication network. In particular, the term may refer to a 3G, 4G or 5G base station (typically abbreviated as NB, eNB, or gNB).

As used herein, a wireless terminal may refer to a mobile device comprising a radio interface by which radio connectivity to a wireless communication network, in particular to a cellular network, may be established and maintained. Examples for such mobile devices comprise User Equipments (UEs), smartphones and laptop computers.

As used herein, downlink communication may refer to communication between an access node and at least one wireless terminal, towards the at least one wireless terminal.

As used herein, downlink polarization may refer to a polarization of a polarization-controlled signal which is part of a downlink communication.

In step 207, the wireless terminal 10 selects a reference polarization from the at least one downlink polarization. The reference polarization denotes a polarization state with respect to which all other polarizations may be measured or determined. The reference polarizations selected by the access node 30 and the wireless terminal 10 (see step 405 above) ideally correspond to each other.

The selecting 207 may be performed in accordance with a predefined rule being valid at least between the wireless terminal 10 and the access node 30.

For instance, if the at least one downlink polarization comprises a single downlink polarization, the single downlink polarization may be selected 207 as the reference polarization.

For instance, if the at least one downlink polarization comprises two downlink polarizations, either of the two downlink polarizations may be selected 207 as the reference polarization, such as the first one, or the second one.

Embodiments selecting 207, 405 a reference polarization from the at least one downlink polarization in accordance with a predefined rule do not require any corresponding signaling.

In step 210, the wireless terminal 10 configures at least one uplink polarization of at least one uplink communication between the wireless terminal 10 and the access node 30. This step is based on the reference polarization and a polarization tracking ability of the wireless terminal 10.

As indicated in FIG. 1, the at least one uplink communication between the wireless terminal 10 and the access node 30 may comprise at least one dedicated radio signal.

In step 410, the access node 30 determines the at least one uplink polarization of the at least one uplink communication between the wireless terminal 10 and the access node 30.

As used herein, a polarization tracking ability may refer to a property or capacity of a wireless terminal to perform polarization tracking of a received polarization-controlled signal momentarily, i.e. under the prevalent circumstances. For instance, this could depend on angle-of-arrival, AoA, angle-of-departure, AoD, and antenna properties, be limited by the transmission channel, or it could depend on the transmit power level of the wireless terminal, related to the hardware implementation. An access node may be able to observe this property as specified in more detail below.

Given the polarization tracking ability, the wireless terminal 10 may, for instance, straightforwardly select 207 a downlink polarization of an existing downlink pilot signal, such as the CSI-RS, as the reference polarization, and configure 210 this reference polarization as the uplink polarization.

As used herein, uplink communication may refer to communication between an access node and a wireless terminal, towards the access node.

As used herein, uplink polarization may refer to a polarization of a polarization-controlled signal which is part of an uplink communication.

In step 411, the access node 30 determines a polarization tracking ability of the wireless terminal 10. This step is based on the at least one uplink polarization and the reference polarization.

For instance, the access node 30 may form a difference of the determined at least one uplink polarization and the selected reference polarization, and determine 411 that the wireless terminal 10 has a polarization tracking ability if the formed difference is less than a given threshold value. In other terms, the wireless terminal 10 has a polarization tracking ability if it adjusts the at least one uplink polarization to correspond to a given reference polarization defined by the access node 30.

Embodiments involving the method steps 204, 207 and 210 as well as 404, 405, 410 and 411 enable the access node 30 to indirectly determine the polarization tracking ability of the wireless terminal 10, without requiring any explicit signaling.

In an alternative embodiment, it may be assumed, or specified mandatory, that any wireless terminal 10 having a polarization tracking capability is expected to have it activated and to determine the at least one downlink polarization on a best effort basis. This would require no additional signaling and based on the determined uplink polarizations of the uplink signals, the access node 30 may indirectly determine the wireless terminal's 10 polarization tracking ability.

Figure 2:
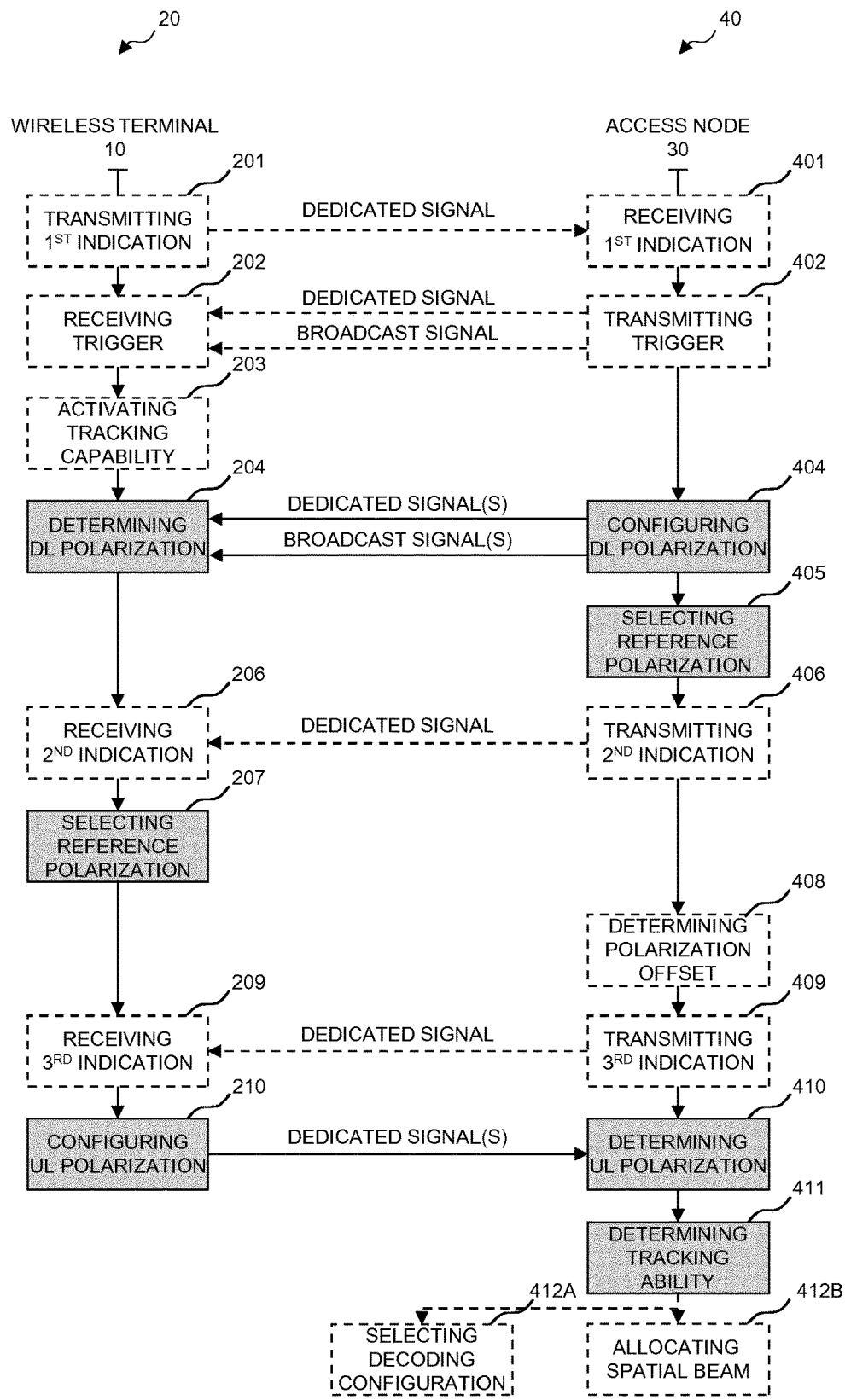
FIG. 2 illustrates respective methods according to preferred embodiments performed by the wireless terminal and the access node in the wireless communication network 10, 30.

FIG. 2 illustrates respective methods 20; 40 according to preferred embodiments performed by the wireless terminal 10 and the access node 30 in the wireless communication network 10, 30.

As in FIG. 1, the method 20 performed by the wireless terminal 10 is shown at a left-hand side of FIG. 2, and the method 40 performed by the access node 30 is shown at a right-hand side of FIG. 2.

In step 201, the wireless terminal 10 may transmit, to the access node 30, a first indication of the polarization tracking capability of the wireless terminal 10.

As indicated in FIG. 2, the first indication of the polarization tracking capability of the wireless terminal 10 may be communicated via a dedicated radio signal.

In step 401, the access node 30 may receive, from the wireless terminal 10, the first indication of the polarization tracking capability of the wireless terminal 10.

Embodiments involving the method steps 201 and 401 enable the wireless terminal 10 to explicitly signal to the access node 30 that it has a polarization tracking capability.

Alternatively or additionally, this capability may already be known to the access node 30 a-priori. For instance, a specification release supported by the wireless terminal 10 may be indicative of this capability.

In any case, the access node 30 then knows that under favorable circumstances, it can expect the wireless terminal 10 to track a polarization of a polarization-controlled signal.

Additionally or alternatively, in step 402, the access node 30 may transmit, to the wireless terminal 10, a trigger for activation of the polarization tracking capability of the wireless terminal 10.

As indicated in FIG. 2, the trigger for activation of the polarization tracking capability of the wireless terminal 10 may be communicated via at least one polarization-controlled dedicated radio signal and/or at least one polarization-controlled broadcast radio signal.

In step 202, the wireless terminal 10 may receive, from the access node 30, the trigger for activation of the polarization tracking capability of the wireless terminal 10.

In step 203, the wireless terminal 10 may activate the polarization tracking capability of the wireless terminal 10, in response to receiving 202 the trigger.

Embodiments involving the method steps 402, 202 and 203 enable the access node 30 to force or request from wireless terminals 10 having (indicated) a polarization tracking capability to actually make use of this functionality. For instance, wireless terminals 10 may not make use of a polarization tracking capability for reasons of battery efficiency, by switching off the communications functionality associated with one of the dual polarizations.

At this point, the above-referenced method steps 404, 405 and 204 of the methods 20; 40 are performed.

In step 406, the access node 30 may transmit, to the wireless terminal 10, a second indication of the reference polarization to be selected from the at least one downlink polarization.

As indicated in FIG. 2, the second indication of the reference polarization to be selected from the at least one downlink polarization may be communicated via a dedicated radio signal.

For instance, if the at least one downlink polarization comprises multiple downlink polarizations, the access node 30 may select 405 a particular one of the multiple downlink polarizations as the reference polarization, and may indicate such to the wireless terminal 10.

In particular, if the at least one downlink polarization comprises two downlink polarizations, either one of the two downlink polarizations, such as the first one or the second one, may be selected 405 and indicated to the wireless terminal 10.

In particular, if the at least one downlink polarization comprises three downlink polarizations, any one of the three downlink polarizations, such as the third one, may be selected 405 and indicated to the wireless terminal 10. The remaining two of the three downlink polarizations may be used to estimate the channel and/or calculate a precoding matrix, for example.

In step 206, the wireless terminal 10 may receive, from the access node 30, the second indication of the reference polarization to be selected from the at least one downlink polarization.

At this point, the above-referenced selecting step 207 of the method 20 is performed in accordance with the received reference polarization.

In one embodiment, the wireless terminal 10 may receive one pilot signal (e.g. CSI-RS) and use the complex conjugated received downlink signal as a precoder. The received signal at the access node 30 will then be the complex conjugate of what it transmitted. The access node 30 knowing this may precode the original signal accordingly. This embodiment is simple and requires few resources, while at the same time being limited to unitary rotational channel matrices (e.g. line of sight).

In another embodiment, the wireless terminal 10 may receive two pilot signals, one in each downlink polarization ($y_1$ and $y_2$), from which it may estimate the channel matrix H. The access node 30 may further indicate 406 to the wireless terminal 10 that it shall select 207 the reference polarization from one of the two pilots and use one of precoders $W=H^{-T}H^{-1}y_1$ or $W=H^{-T}H^{-1}y_2$. Alternatively, it may be possible that the precoder is a function of both $y_1$ and $y_2$, $W=H^{-T}H^{-1}f(y_1, y_2)$.

In yet another embodiment, the wireless terminal 10 may receive three pilot signals, one in each downlink polarization ($y_1$ and $y_2$) from which it may estimate the channel matrix H, and a third pilot $y_3$ which may also be configured 404 by the access node 30 to define a desired uplink polarization, and which may consequently be selected 207 by the wireless terminal 10 as the reference polarization. Then, the wireless terminal 10 may use the precoder $W=H^{-T}H^{-1}y_3$. The two first pilots $y_1$ and $y_2$ may be broadcasted during beam sweeps while the third pilot $y_3$ may be dedicated.

Embodiments involving the method steps 406 and 206 enable the access node 30 to force or request from wireless terminals 10 having (indicated) a polarization tracking capability to select a particular reference polarization of a choice of downlink polarizations.

Depending on a wireless terminal's 10 antenna configuration and front-end design, a current consumption of the wireless terminal 10 may be reduced if transmissions are performed in non-arbitrary polarizations aligned with the coordinate system of the terminal.

In steps 408 and 409, the access node 30 may determine at least one polarization offset of the at least one uplink polarization with respect to the reference polarization, and may transmit, to the wireless terminal 10, a third indication of the at least one polarization offset.

As used herein, a polarization offset may refer to a difference between two given polarization states, for instance in terms of an intermediate angle of the directions of the electric field vectors of the respective radio waves in a plane normal to a propagation direction of the waves, or in any other quantity associated with such an intermediate angle.

As indicated in FIG. 2, the third indication of the at least one polarization offset may be communicated via a dedicated radio signal.

In step 209, the wireless terminal 10 may receive, from the access node 30, the third indication of the at least one polarization offset of the at least one uplink polarization with respect to the reference polarization. The configuring 210 may be performed in accordance with the at least one polarization offset.

In particular, the at least one polarization offset may be less than a predefined threshold. The predefined threshold may be a small percentage, preferably 10%, more preferably 5%, and most preferably 1%, of the maximum polarization offset, for instance. In other terms, the at least one uplink polarization and the reference polarization may correspond to each other.

Embodiments involving the method steps 408, 409 and 209 enable the access node 30 to define the at least one uplink polarization of the at least one uplink communication to correspond to particular offset values with respect to the reference polarization. Thus, even if the uplink and/or downlink polarizations should be subject to changes due to polarization effects, the at least one uplink polarization is changed consistently. For instance, given that the at least one uplink polarization comprises two uplink polarizations, then both of these uplink polarizations may be subjected to the same polarization effects so that they may be rotated consistently, preserving a relative polarization offset with one another.

For instance, different layer streams or different wireless terminals 10 may be assigned relative to the same reference polarization.

In step 412A, the access node 30 may select, based on the polarization tracking ability of the wireless terminal 10 determined in step 411, a decoding configuration for the at least one uplink communication.

Embodiments involving the method step 412A enable the access node 30 to simplify its decoding, and thus optimize a layer separation based on polarization only (P-MIMO). A wireless terminal 10 transmitting its layer streams in accordance with the coordinate system of the access node may enable the access node 30 to deploy a simpler decoder at the receive side, which relaxes the burden of the access node 30.

Alternatively, in step 412B, the access node 30 may allocate, based on the polarization tracking ability of the wireless terminal 10 determined in step 411, the at least one uplink communication to a polarization-multiplexed spatial beam.

Embodiments involving the method step 412B enable the access node 30 to define the polarizations of wireless terminals being equipped with dual polarized antennas and thus being capable of communicating in both polarizations.

Wireless terminals 10 using neighboring spatial beams are likely to interfere with each other due to beam overlap or from reflections, and may thus be allocated to orthogonal polarizations. This may reduce interference among the wireless terminals 10, and thus improve system performance. This improvement applies to either of uplink and downlink communication, and even if only one of two interfering wireless terminals has a polarization tracking capability.

In case of polarization-based MU-MIMO, different wireless terminals 10 may be allocated to a same spatial beam on different polarizations. The polarization used by each wireless terminal 10 can be defined by the access node 30, so that orthogonality can be guaranteed.

Figure 3:
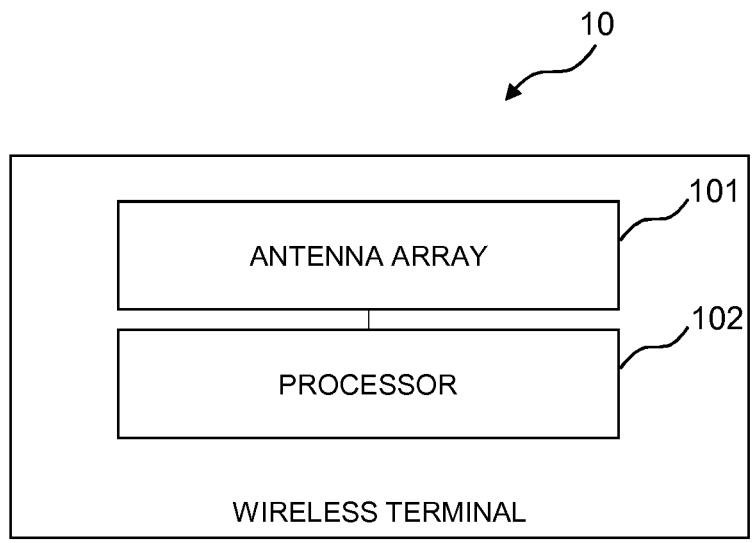
FIG. 3 illustrates schematically a wireless terminal according to a third aspect.

FIG. 3 illustrates schematically the wireless terminal 10 according to a third aspect.

The illustrated wireless terminal 10 comprises an antenna array 101 and a processor 102.

The antenna array 101 has antenna elements being associated with mutually orthogonal planes of polarization. In other terms, the antenna array 101 is dual polarized.

The processor 102 is configured for execution of method steps 204, 207, and 210.

In step 204, based on a polarization tracking capability of the wireless terminal 10, at least one downlink polarization of at least one downlink communication between the wireless terminal 10 and an access node 30 of the wireless communication network 10, 30 is determined.

In step 207, a reference polarization is selected from the at least one downlink polarization.

In step 210, based on the reference polarization and a polarization tracking ability of the wireless terminal 10, at least one uplink polarization of at least one uplink communication between the wireless terminal 10 and the access node 30 is configured.

Additionally, the wireless terminal 10 may be configured for carrying out the method of the first aspect according to various embodiments, in particular any of the method steps 201, 202, 203, 206, and 209.

Accordingly, the technical effects and advantages described above in relation with the method 20 of the first aspect equally apply to the wireless terminal 10 having corresponding features.

Figure 4:
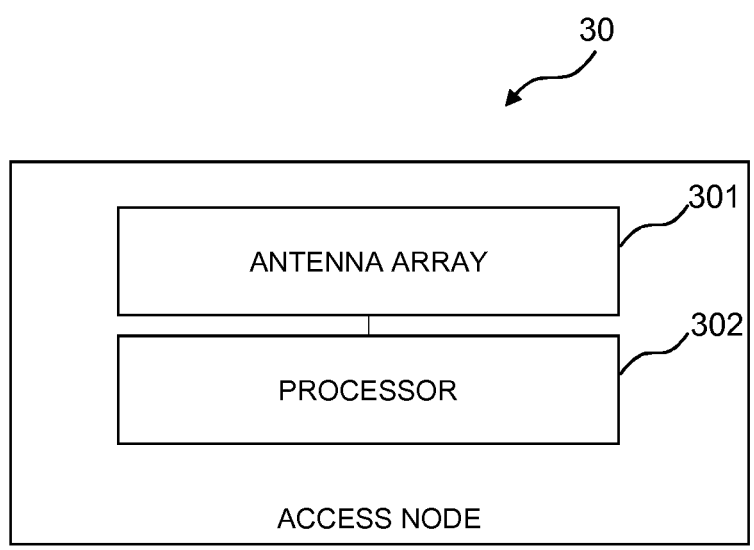
FIG. 4 illustrates schematically an access node according to a fourth aspect.

FIG. 4 illustrates schematically the access node 30 according to a fourth aspect.

The illustrated access node 30 comprises an antenna array 301 and a processor 302.

The antenna array 301 has antenna elements being associated with mutually orthogonal planes of polarization. In other terms, the antenna array 301 is dual polarized.

The processor 302 is configured for execution of method steps 404, 405, 410, and 411:

In step 404, at least one downlink polarization of at least one downlink communication between a wireless terminal 10 of the wireless communication network 10, 30 and the access node 30 is configured.

In step 405, a reference polarization is selected from the at least one downlink polarization.

In step 410, at least one uplink polarization of at least one uplink communication between the wireless terminal 10 and the access node 30 is determined.

In step 411, based on the at least one uplink polarization and the reference polarization, a polarization tracking ability of the wireless terminal 10 is determined.

Additionally, the access node 30 may be configured for carrying out the method of the second aspect according to various embodiments, in particular any of the method steps 401, 402, 406, 408, 409, and 412A or 412B.

Accordingly, the technical effects and advantages described above in relation with the method 40 of the second aspect equally apply to the access node 30 having corresponding features.

The present invention may, of course, be carried out in other ways than those specifically set forth herein without departing from essential characteristics of the invention. Those skilled in the art will therefore appreciate that the illustrated embodiments are to be considered in all respects as illustrative and not restrictive, and all changes coming within the meaning and equivalency range of the appended claims are intended to be embraced therein.

The invention claimed is:

1. A method performed by a wireless terminal in a wireless communication network, the method comprising:
using a polarization tracking capability of the wireless terminal, determining at least one downlink polarization of at least one downlink communication between the wireless terminal and an access node of the wireless communication network;
selecting a reference polarization from the at least one downlink polarization determined using the polarization tracking capability; and
based on the reference polarization and a polarization tracking ability of the wireless terminal, configuring at least one uplink polarization of at least one uplink communication between the wireless terminal and the access node.

2. The method of claim 1, further comprising
transmitting, to the access node, a first indication of the polarization tracking capability of the wireless terminal.

3. The method of claim 1, further comprising
receiving, from the access node, a trigger for activation of the polarization tracking capability of the wireless terminal; and
in response to receiving the trigger, activating the polarization tracking capability of the wireless terminal.

4. The method of claim 1,
the at least one downlink polarization comprising at least one polarization of at least one polarization-controlled downlink signal dedicated to the wireless terminal.

5. The method of claim 1,
the at least one downlink polarization comprising at least one polarization of at least one polarization-multiplexed downlink broadcast signal.

6. The method of claim 1,
the at least one downlink polarization comprising at least one polarization of a polarization-controlled pilot signal.

7. The method of claim 1, further comprising
receiving, from the access node, a second indication of the reference polarization to be selected from the at least one downlink polarization, the selecting being performed in accordance with the reference polarization.

8. The method of claim 1, further comprising
receiving, from the access node, a third indication of at least one polarization offset of the at least one uplink polarization with respect to the reference polarization, the configuring being performed in accordance with the at least one polarization offset.

9. The method of claim 8,
the at least one polarization offset being less than a predefined threshold.

10. A method performed by an access node in a wireless communication network, the method comprising:
configuring at least one downlink polarization of at least one downlink communication between a wireless terminal of the wireless communication network and the access node;
selecting a reference polarization from the at least one downlink polarization;
determining at least one uplink polarization of at least one uplink communication between the wireless terminal and the access node; and
based on the at least one uplink polarization and the reference polarization, determining a polarization tracking ability of the wireless terminal.

11. The method of claim 10, further comprising
transmitting, to the wireless terminal, a trigger for activation of the polarization tracking capability of the wireless terminal.

12. The method of claim 10,
the at least one downlink polarization comprising at least one polarization of a polarization-controlled downlink signal dedicated to the wireless terminal; or
the at least one downlink polarization comprising at least one polarization of a polarization-multiplexed downlink broadcast signal.

13. The method of claim 10,
the at least one downlink polarization comprising at least one polarization of a polarization-controlled pilot signal.

14. The method of claim 10, further comprising
transmitting, to the wireless terminal, a second indication of the reference polarization to be selected from the at least one downlink polarization.

15. The method of claim 10, further comprising
determining at least one polarization offset of the at least one uplink polarization with respect to the reference polarization; and
transmitting, to the wireless terminal, a third indication of the at least one polarization offset.

16. The method of claim 15,
the at least one polarization offset being less than a predefined threshold.

17. The method of claim 10, further comprising
based on the polarization tracking ability of the wireless terminal, selecting a decoding configuration for the at least one uplink communication.

18. The method of claim 10, further comprising
based on the polarization tracking ability of the wireless terminal, allocating the at least one uplink communication to a polarization-multiplexed spatial beam.

19. A wireless terminal, comprising:
an antenna array having antenna elements being associated with mutually orthogonal planes of polarization, and
a processor being configured for
  using a polarization tracking capability of the wireless terminal, determining at least one downlink polarization of at least one downlink communication between the wireless terminal and an access node of the wireless communication network;
  selecting a reference polarization from the at least one downlink polarization determined using the polarization tracking capability; and
  based on the reference polarization and a polarization tracking ability of the wireless terminal, configuring at least one uplink polarization of at least one uplink communication between the wireless terminal and the access node.

20. An access node, comprising
an antenna array having antenna elements being associated with mutually orthogonal planes of polarization, and
a processor being configured for
  configuring at least one downlink polarization of at least one downlink communication between a wireless terminal of the wireless communication network and the access node;
  selecting a reference polarization from the at least one downlink polarization;
  determining at least one uplink polarization of at least one uplink communication between the wireless terminal and the access node; and
  based on the at least one uplink polarization and the reference polarization, determining a polarization tracking ability of the wireless terminal.

* * * * *